(No Model.)

E. T. MOORE.
TRAP.

No. 590,019.  Patented Sept. 14, 1897.

WITNESSES
C. E. Hunt
J. C. Tappan

INVENTOR,
Edward T. Moore,
by John Wedderburn
Attorney

UNITED STATES PATENT OFFICE.

EDWARD T. MOORE, OF STEELTON, PENNSYLVANIA, ASSIGNOR OF ONE-HALF TO NATHANIEL S. FENCIL, OF SAME PLACE.

TRAP.

SPECIFICATION forming part of Letters Patent No. 590,019, dated September 14, 1897.

Application filed August 29, 1896. Serial No. 604,285. (No model.)

*To all whom it may concern:*

Be it known that I, EDWARD T. MOORE, a citizen of the United States, residing at Steelton, in the county of Dauphin and State of Pennsylvania, have invented certain new and useful Improvements in Traps; and I do hereby declare the following to be a full, clear, and exact description of the invention, such as will enable others skilled in the art to which it appertains to make and use the same.

This invention relates to a novel construction in an animal-trap adapted for use with large or small game; and it consists in the features of construction and combinations of parts hereinafter described and specifically claimed.

Figure 1:
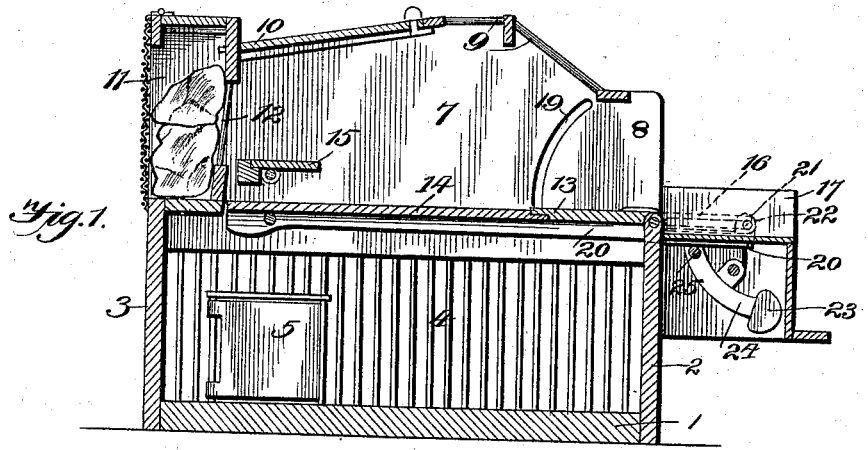
Figure 2:
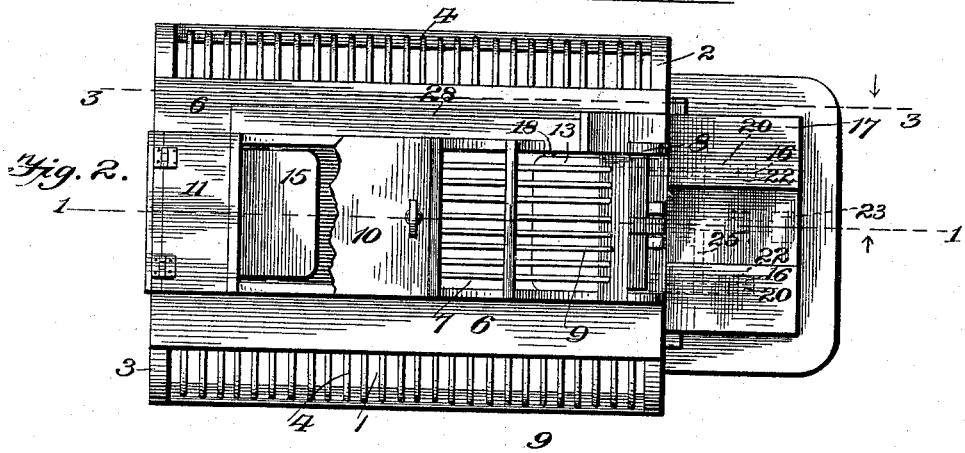
Figure 3:
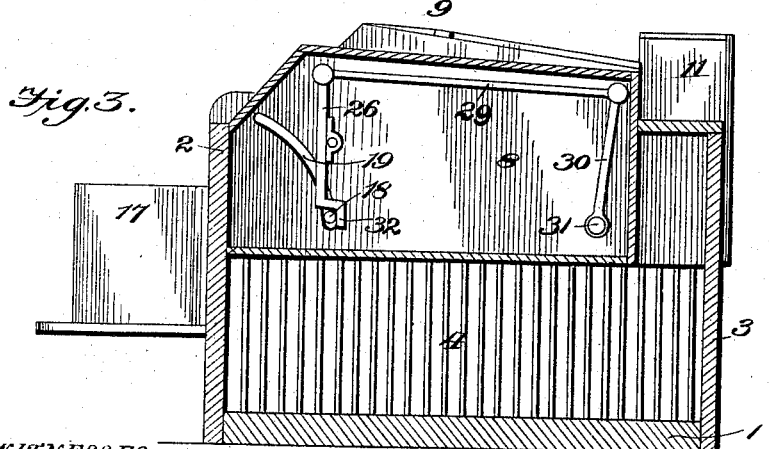

In the accompanying drawings, illustrating my invention, Figure 1 is a vertical longitudinal section taken on the line 1 1 of Fig. 2. Fig. 2 is a top plan view with parts broken away for convenience in illustration. Fig. 3 is a vertical longitudinal section taken on line 3 3 of Fig. 2.

Referring now to said drawings, 1 indicates the base of the trap, having the solid upright end walls 2 and 3 and the side bars 4, one side of which is provided with a door 5. The bars 4 are suitably connected with the base and end walls of the trap and with the top framework 6 in any approved manner.

Extending longitudinally between the end walls 2 and 3 and forming between them a receptacle 7 are the upright partitions 8. Between these partitions the end walls 2 and 3 are cut away, while extending between the top of the partitions is a grating 9 and a removable door 10. At the rear end of the trap and between these partitions 8 is a bait-receptacle 11, also provided with a suitable cover. This bait-receptacle is separated from the receptacle 7 between the partitions by a suitable grating 12.

This trap is adapted to work automatically, and consists of three elements—namely, a hinged door 13, a pivoted platform 14, and a trigger-platform 15. These three parts are situated between the partitions 8 and are arranged in the following manner:

The door 13 is pivoted adjacent to the end wall 2 and can swing thereon from an upright position, wherein it closes the entrance to the trap to a horizontal position within the trap. Connected with this door 13 and extending beyond its pivot are two loops 16, that extend beyond the end wall 2 and are situated within a protecting-casing 17. The door 13 is provided laterally near its free end with a finger or projection 18, that is situated in a segmental slot 19 in one of the partitions 8.

The platform 14 is pivoted near the rear end of the trap and extends forward a sufficient distance so that when the door 13 is in a horizontal position it will slightly overlap the forward end of this platform. This platform is also provided near its forward end with arms 20, that extend forwardly adjacent to the partitions through the front wall 2 of the trap and into the casing 17. At their forward ends and within the casing these arms 20 are provided with upturned ends 21, having pins 22, that are situated within the loops 16 of the door 13. These parts are so arranged that when the door 13 is in a horizontal position the platform 14 will be in its elevated position, and it is sustained in this position by counterbalancing-weight 23. This counterbalance-weight 23 is fastened to one end of a lever 24, that is suitably pivoted within the casing 17, carrying at its outer end the arms 25, that come in contact with the lower faces of the platform-arms 20. In this way it will be seen that the counterbalance-weight 23 will elevate these platform-arms, and consequently the platform, which in turn, through the loops 16, throws the door 13 to a horizontal position. To lock the platform and door in this position, I employ a latch 26, that is pivoted adjacent to the segmental slot 19 and to the outer face of the partition 8 and between said partition and a plate 28. The upper end of this latch-lever 26 is pivoted to a rod 29, that is connected to an arm 30, extending from the pivot 31 to the trigger-platform 15. The lower end of the latch-lever 26 has an offset end 32, so arranged that it will engage the finger 18 of the door 13 when the latter is in its horizontal position.

The trigger-platform 15 is so arranged with relation to its pivot that it stands normally in a horizontal position, as shown. Its connection with the latch-lever is such that the latter will be held in the path of the finger 18. It will be seen, therefore, that when the trap is set this latch will hold the parts against movement until they are released by the movement of the trigger-platform.

I will now proceed to describe the operation of this trap.

We will suppose, for instance, that the platform is in its upper position and the door 13 in a horizontal position with suitable bait within the bait-receptacle. The animal entering through the front entrance and passing over the door and platform to the bait-receptacle will tread upon the trigger-platform, and thus release the door 13. The weight of the animal upon the platform 14 will cause it to descend and throw the door 13 in an upright position and close the entrance to the trap. This will expose the entrance to the lower portion of the trap, and the animal will pass into the body portion of the trap, whereupon the counterbalance-weight 23 will lift the outer end of the platform 14, throw the door 13 to its horizontal position, and allow the finger 18 to be caught by the latch 26.

Having thus described my invention, what I claim as new, and desire to secure by Letters Patent, is—

In a trap, the combination with a base and end and side walls, of a receptacle 7 formed by upright longitudinal partitions, a platform pivoted near the rear end of said trap and extending between said partitions, arms upon the forward ends of said platform, a hinged door 13 near the forward end of said receptacle 7 adapted to overlap the forward end of said platform, and provided with loops engaging the said arms of said platform, a counterbalance-weight acting upon the forward ends of said arms of the platform, and a trigger-platform connected with a latch acting upon the said door, substantially as described.

In testimony whereof I have signed this specification in the presence of two subscribing witnesses.

EDWARD T. MOORE.

Witnesses:
OSCAR G. WICKERSHAM,
NATHANIEL S. FENCIL.